US012601202B2

(12) United States Patent
Revanasiddaiah et al.

(10) Patent No.: US 12,601,202 B2
(45) Date of Patent: Apr. 14, 2026

(54) LOCK WITH OVERRIDE MECHANISM

(71) Applicant: Schlage Lock Company LLC, Carmel, IN (US)

(72) Inventors: Shivalingaswamy M. Revanasiddaiah, Bangalore (IN); Naresh Paddillaya, Mangalore (IN); Achyuta Dhanvantri, Bangalore (IN); Ravi Telang, Bidar (IN)

(73) Assignee: Schlage Lock Company LLC, Carmel, IN (US)

( * ) Notice: Subject to any disclaimer, the term of this patent is extended or adjusted under 35 U.S.C. 154(b) by 364 days.

(21) Appl. No.: 17/538,033

(22) Filed: Nov. 30, 2021

(65) Prior Publication Data

US 2023/0167657 A1 Jun. 1, 2023

(51) Int. Cl.

| | |
|---|---|
| ***E05B 13/00*** | (2006.01) |
| ***E05B 13/10*** | (2006.01) |
| ***E05B 27/02*** | (2006.01) |
| ***E05B 63/00*** | (2006.01) |
| *E05B 47/00* | (2006.01) |
| *G07C 9/00* | (2020.01) |

(52) U.S. Cl.

CPC ........ *E05B 63/0069* (2013.01); *E05B 13/002* (2013.01); *E05B 13/108* (2013.01); *E05B 27/02* (2013.01); *E05B 47/0012* (2013.01); *E05B 2047/0016* (2013.01); *G07C 9/00944* (2013.01)

(58) Field of Classification Search

CPC .. E05B 63/0069; E05B 13/002; E05B 13/108; E05B 27/02; E05B 47/0012; E05B 2047/0016; E05B 17/044; E05B 55/06; E05B 2047/0086; E05B 47/0692; E05B 2047/0031; G07C 9/00944

See application file for complete search history.

(56) References Cited

U.S. PATENT DOCUMENTS

| | | | | |
|---|---|---|---|---|
| 5,628,216 | A * | 5/1997 | Qureshi | E05B 15/04 292/201 |
| 8,051,689 | B1 | 11/2011 | Shen et al. | |
| 9,051,761 | B2 * | 6/2015 | Romero | E05B 37/00 |
| 11,643,845 | B2 * | 5/2023 | Uyeda | E05B 47/026 70/278.1 |

(Continued)

OTHER PUBLICATIONS

International Search Report; International Searching Authority; International Application No. PCT/US2022/051377; Jun. 27, 2023; 2 pages.

(Continued)

*Primary Examiner* — Kristina R Fulton
*Assistant Examiner* — Thomas L Neubauer
(74) *Attorney, Agent, or Firm* — Taft Stettinius & Hollister LLP

(57) ABSTRACT

An example lock apparatus generally includes a housing, a latch spindle, a drive spindle, an electronic lock mechanism, and an override mechanism. The latch spindle is mounted for rotation relative to the housing, and is operable to actuate a latch mechanism. The drive spindle is mounted for rotation relative to the housing. The electronic lock mechanism is disposed in the housing, and is operable to selectively couple the drive spindle with the latch spindle. The override mechanism is disposed in the drive spindle, and is operable to selectively couple the drive spindle with the latch spindle.

19 Claims, 9 Drawing Sheets

(56) References Cited

U.S. PATENT DOCUMENTS

| | | | | |
|---|---|---|---|---|
| 2007/0051145 | A1 | 3/2007 | Chang | |
| 2020/0109578 | A1 * | 4/2020 | Lunday | E05B 55/005 |
| 2021/0348422 | A1 | 11/2021 | Kumar et al. | |

OTHER PUBLICATIONS

Written Opinion of the International Searching Authority; International Searching Authority; International Application No. PCT/US2022/051377; Jun. 27, 2023; 9 pages.

Australian Examination Report No. 1; IP Australia; Australian Patent Application No. 2022400766; Jul. 23, 2025; 3 pages.

Examination Report No. 1; IP Australia; Australian Patent Application No. 2022400766; Jun. 10, 2025; 4 pages.

Canadian Examination Report; Canadian Intellectual Property Office; Canadian Patent Application No. 3,239,718; Nov. 4, 2025; 6 pages.

New Zealand Examination Report 1; New Zealand Intellectual Property Office; New Zealand Application No. 812576; Dec. 1, 2025; 3 pages.

* cited by examiner

LOCK WITH OVERRIDE MECHANISM

TECHNICAL FIELD

The present disclosure generally relates to locksets, and more particularly but not exclusively relates to mechanical override mechanisms for electronic locksets.

BACKGROUND

Electronic locksets are occasionally provided with mechanical override mechanisms for unlocking of the lockset when power is down or the electronic credential is unavailable. While certain existing electronic locksets include key-actuated mechanical override mechanisms, such override mechanisms are typically mounted to the escutcheon, a location that is unfamiliar to certain users. For these reasons among others, there remains a need for further improvements in this technological field.

SUMMARY

An example lock apparatus generally includes a housing, a latch spindle, a drive spindle, an electronic lock mechanism, and an override mechanism. The latch spindle is mounted for rotation relative to the housing, and is operable to actuate a latch mechanism. The drive spindle is mounted for rotation relative to the housing. The electronic lock mechanism is disposed in the housing, and is operable to selectively couple the drive spindle with the latch spindle. The override mechanism is disposed in the drive spindle, and is operable to selectively couple the drive spindle with the latch spindle. Further embodiments, forms, features, and aspects of the present application shall become apparent from the description and figures provided herewith.

DETAILED DESCRIPTION OF ILLUSTRATIVE EMBODIMENTS

Figure 1:
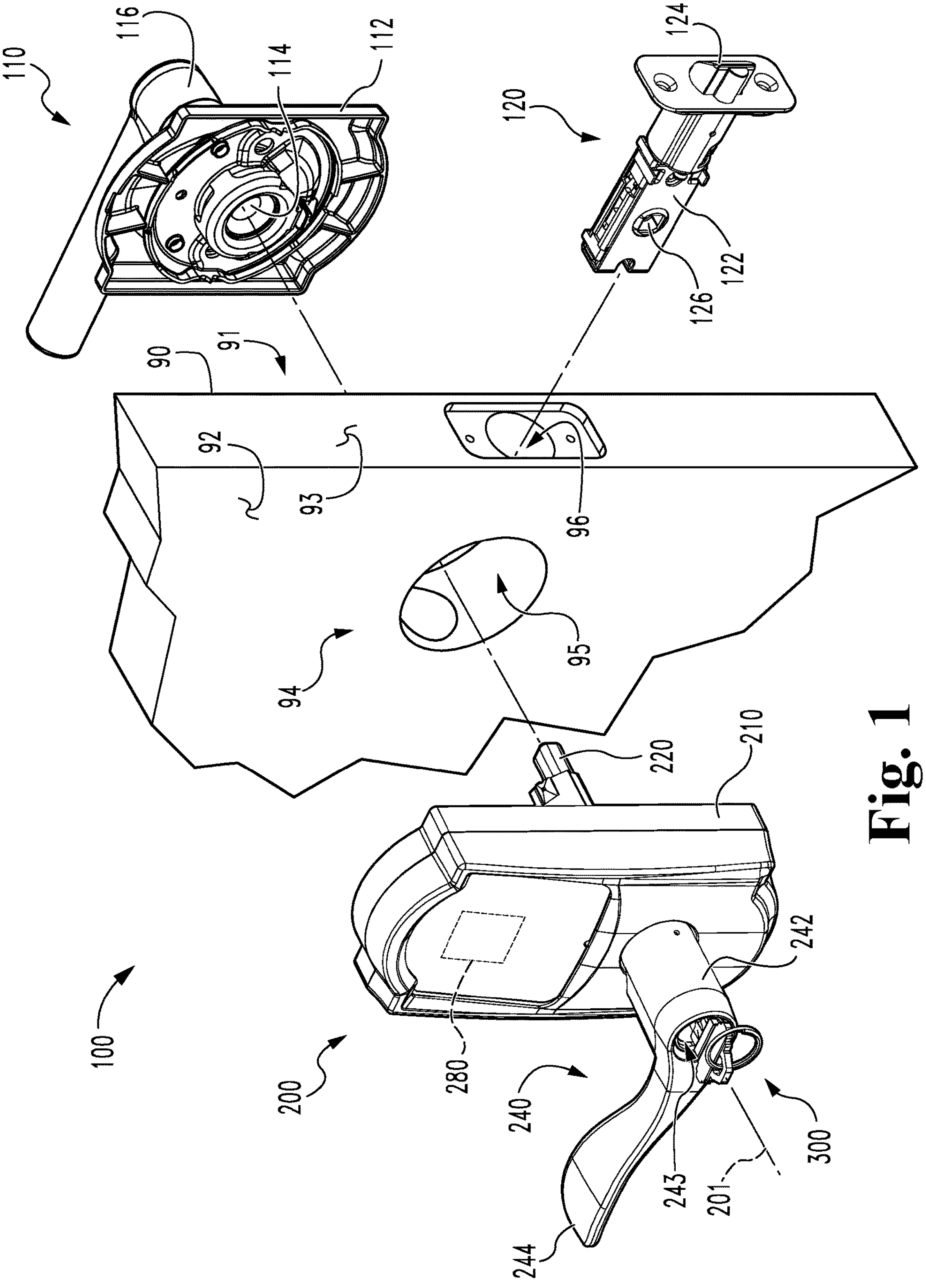
FIG. 1 is an exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, motion or spacing along a direction defined by one axis need not preclude motion or spacing along a direction defined by another axis. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Furthermore, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a door 90 having mounted thereon an electronic lockset 100 according to certain embodiments. The door 90 has an egress side 91, a non-egress side 92 opposite the egress side 91, and a latch edge 93 extending between and connecting the egress side 91 and the non-egress side 92. The door 90 also includes a door preparation 94 including a cross-bore 95 that extends longitudinally between the egress side 91 and the non-egress side 92, and a latch bore 96 that extends laterally from the cross-bore 95 to the latch edge 93. The lockset 100 generally includes an inside trim assembly 110 mounted to the egress side 91, a latch mechanism 120 mounted within the latch bore 96, and an outside trim assembly 200 mounted to the non-egress side 92.

The inside trim assembly 110 is mounted to the egress side 91 of the door 90, and generally includes an inside rose or inside escutcheon 112, an inside spindle 114 rotatably mounted to the escutcheon 112, and an inside handle 116 mounted to the inside spindle 114. As described herein, the inside spindle 114 is operably coupled with a latch spindle 220 that is engaged with the latch mechanism 120 such that the inside handle 116 is operable to actuate the latch mechanism 120. In the illustrated form, the handle 116 is provided in the form of a lever. It is also contemplated that the handle 116 may be provided in another form, such as that of a knob.

The latch mechanism 120 is seated in the latch bore 96, and generally includes a latch housing 122, a latchbolt 124 slidably mounted in the latch housing 122, and at least one retractor 126 rotatably mounted in the latch housing 122. Each retractor 126 is engaged with the latchbolt 124 such that rotation of the retractor 126 from a home position to a rotated position drives the latchbolt 124 from an extended position to a retracted position. In the illustrated for, the latch mechanism 120 includes a single retractor, and the latch spindle 220 extends through the latch mechanism 120 for engagement with the inside spindle 114. It is also contemplated that the latch mechanism 120 may include two retractors 126. In such forms, the latch spindle 220 may engage one of the retractors 126, and the inside spindle 114 may engage the other retractor 126.

Figure 2:
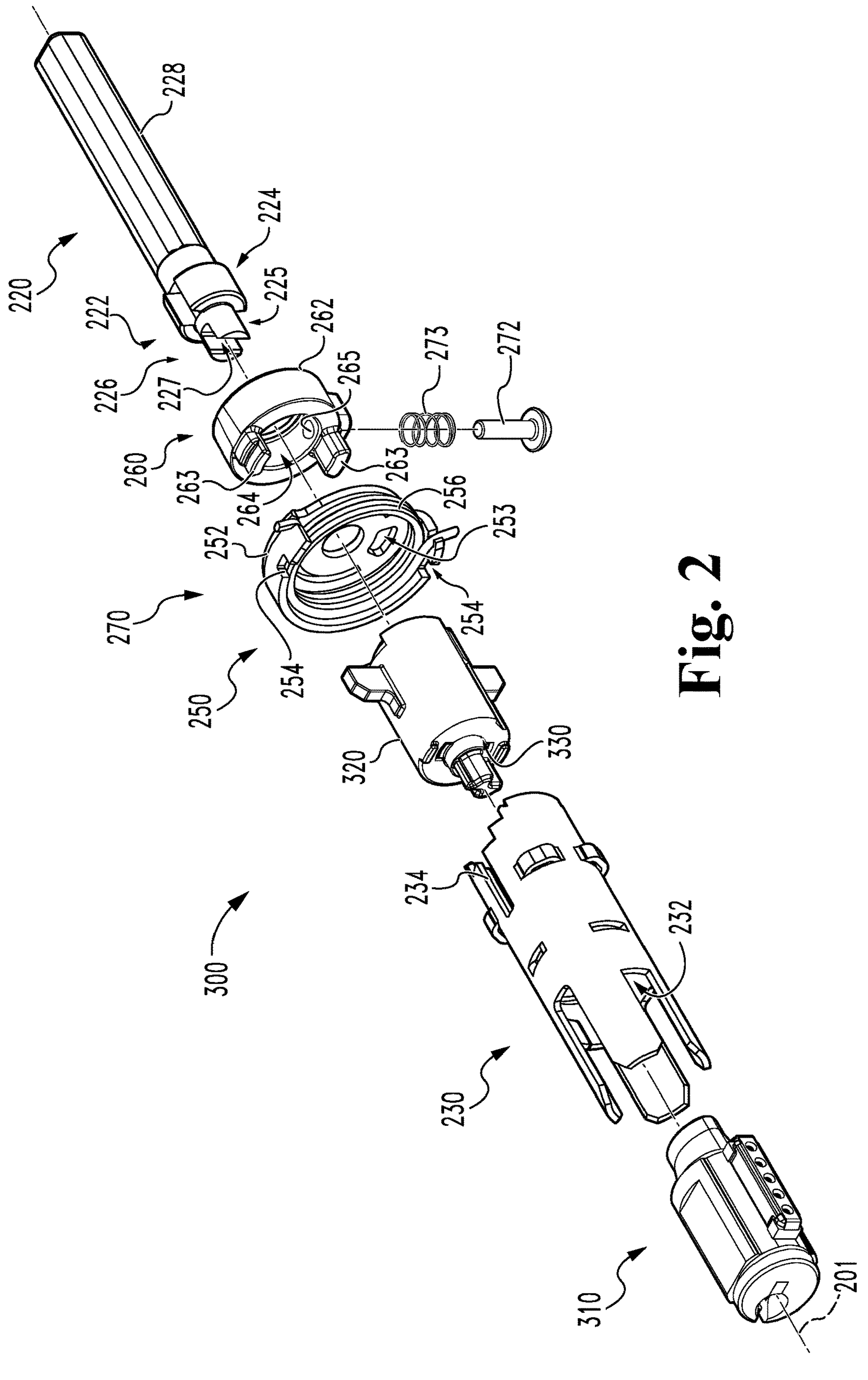
FIG. 2 is an exploded assembly view of a portion of the lockset.

With additional reference to FIG. 2, the outside trim assembly 200 generally includes a housing or escutcheon 210, a latch spindle 220 rotatably mounted to the escutcheon 210, an outside drive spindle 230 rotatably mounted to the escutcheon 210, an outside handle 240 mounted to the outside spindle 230, a spring cage 250 biasing the outside spindle 230 toward a home position, a collar 260 rotatably mounted to the latch spindle 220, an electronic lock mechanism 270 mounted in the escutcheon 210, a control assembly 280 mounted in the escutcheon 210, and an override mechanism 300 mounted in the outside spindle 230. The outside trim assembly 200 has a locked state in which the outside spindle 230 is inoperable to rotate the latch spindle 220 such that the outside handle 240 cannot actuate the latch mechanism 120, and an unlocked state in which the outside spindle 230 is operable to rotate the latch spindle 220 for actuation of the latch mechanism 120. As described herein, each of the electronic lock mechanism 270 and the override mechanism 300 is operable to transition the outside trim assembly 200 from the locked state to the unlocked state.

The housing or escutcheon 210 is configured for mounting to the non-egress side 92 of the door 90, and provides a base to which various other components of the outside trim assembly 200 are mounted. In the illustrated form, at least a portion of the control assembly 280 is mounted in the outside escutcheon 210. It is also contemplated that at least a portion of the control assembly 280 may be mounted elsewhere, such as within the inside trim assembly 110 and/or at a location remote to the lockset 100.

The latch spindle 220 is mounted for rotation relative to the escutcheon 210 about a rotational axis 201, and generally includes a proximal end portion 222 and a stem 228 extending distally from the proximal end portion 222. The proximal end portion 222 includes a generally cylindrical body portion 224 including at least one notch 225, and a post 226 including an engagement feature 227 extends proximally from the body portion 224. The stem 228 is sized and shaped to extend through the latch mechanism 120 and engage the inside spindle 114 such that the inside handle 116 is operable to rotate the latch spindle 220. The stem 228 is also engaged with the retractor 126 such that rotation of the latch spindle 220 from a home position to a rotated position actuates the latch mechanism 120 and retracts the latchbolt 124.

The outside drive spindle 230 is mounted for rotation relative to the escutcheon 210 about the rotational axis 201 between a home position and a rotated position, and is biased toward its home position by the spring cage 250 as described herein. The outside spindle 230 is generally tubular, and defines a spindle chamber 232 in which the override mechanism 300 is seated. The outside spindle 230 includes a pair of longitudinal slots 234, which extend proximally from a distal end of the spindle 230.

The outside handle 240 is rotationally coupled with the outside spindle 230 such that the handle 240 is operable to rotate the outside spindle 230 about the rotational axis 201, and is biased toward a home position by the spring cage 250. The handle 240 generally includes a shank 242 defining a chamber 243, and a grip portion 244 extending from the shank 242. In the illustrated form, the outside handle 240 is provided in the form of a lever. It is also contemplated that the handle 240 may be provided in another form, such as that of a knob.

The spring cage 250 generally includes a bracket 252 mounted for rotation relative to the escutcheon 210 about the rotational axis 201, and a bias mechanism 256 biasing the bracket 252 toward a home position. The bracket 212 includes a pair of apertures 253 that receive lugs 263 of the collar 260, and a pair of notches 254 that align with the slots 234 of the outside spindle 230. As described herein, the bracket 212 is rotationally coupled with the outside spindle 230 and the collar 260. The bias mechanism 256 is engaged between the bracket 252 and the escutcheon 210, and biases the bracket 252 toward a home position, thereby biasing the outside spindle 230, the outside handle 240, and the collar 260 toward corresponding and respective home positions. In the illustrated form, the bias mechanism 256 comprises one or more torsion springs. It is also contemplated that the bias mechanism 256 may take another form, such as one including a compression spring, an extension spring, a leaf spring, an elastic member, and/or one or more magnets.

The collar 260 includes a generally annular body portion 262, which defines a chamber 264 in which the cylindrical body portion 224 of the latch spindle 220 is rotatably seated, and an aperture 265 connected with the chamber 264. A pair of lugs 263 extend proximally from the body portion 262 into the apertures 253 of the spring cage bracket 252, thereby rotationally coupling the collar 260 with the bracket 252.

Figure 3:
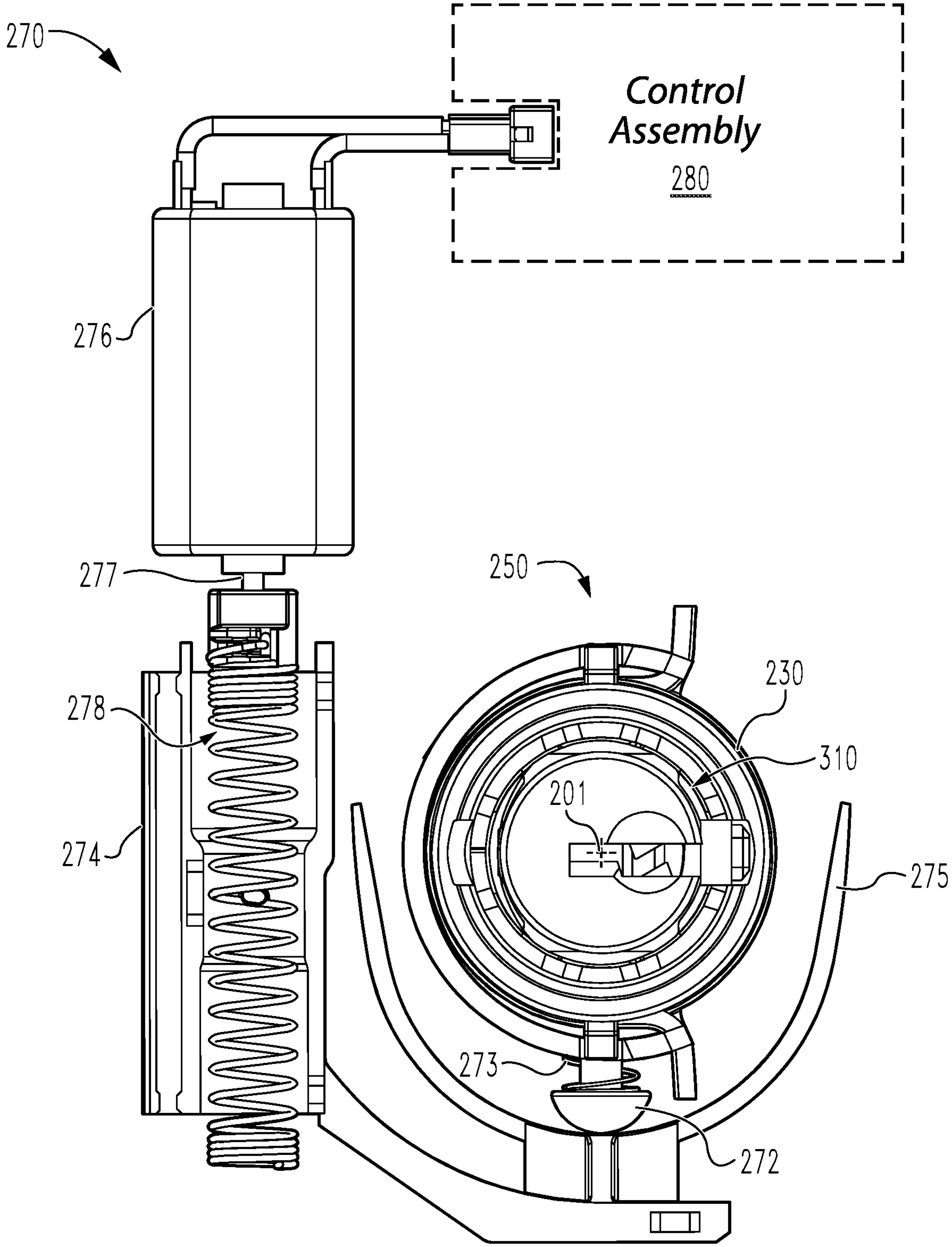
FIG. 3 is a plan view of a portion of the lockset.

With additional reference to FIG. 3, the electronic lock mechanism 270 is in communication with the control assembly 280 such that the control assembly 280 is operable to control the operation of the electronic lock mechanism 270. The electronic lock mechanism 270 generally includes a coupler 272 operable to selectively rotationally couple the collar 260 with the latch spindle 220, a movable wall 274 engaged with the coupler 272, and an actuator 276 engaged with the wall 274, for example via a spring 278. The coupler 272 is mounted in the aperture 265 for movement between a decoupling position and a coupling position, and is biased toward the decoupling position by a bias member 273. As described herein, the actuator 276 is operable to drive the wall 274 between an unlocking position and a locking position to thereby move the coupler 272 between its coupling position and its uncoupling position for locking and unlocking of the trim assembly 200. In the illustrated form, the bias member 273 is provided in the form of a compression spring. It is also contemplated that the bias member 273 may take another form, such as one including an extension spring, a leaf spring, a torsion spring, an elastic member, and/or one or more magnets.

Figure 5:
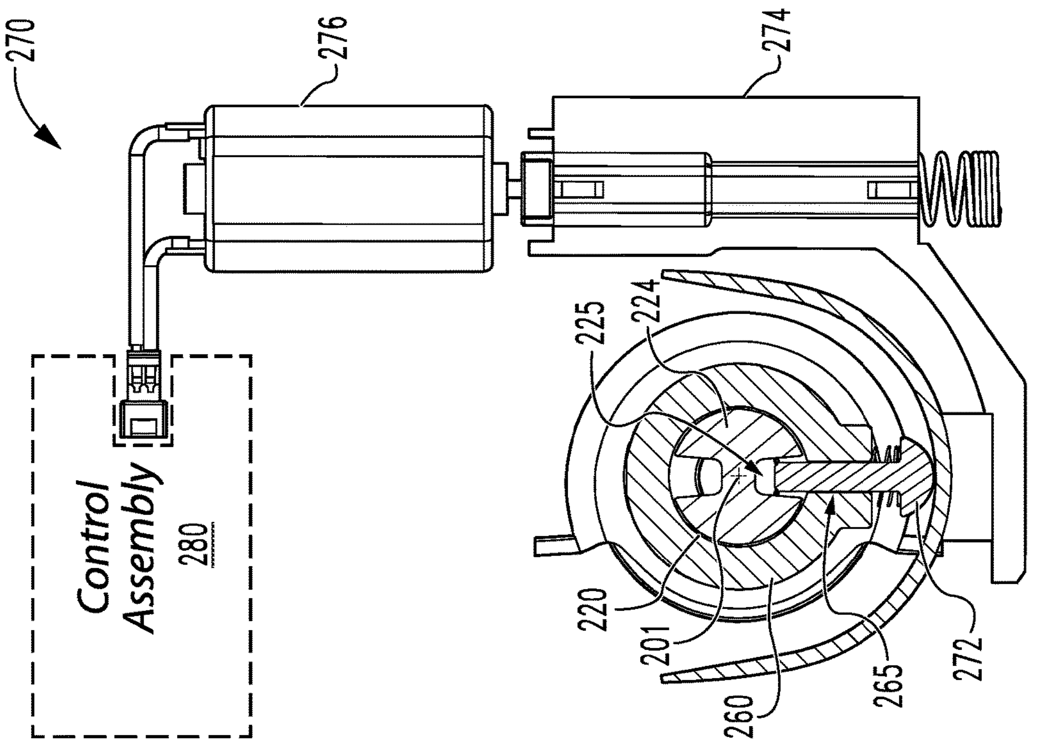
FIG. 5 is a cross-sectional view of a portion of the lockset, with the electronic lock device in an unlocking state.
Figure 4:
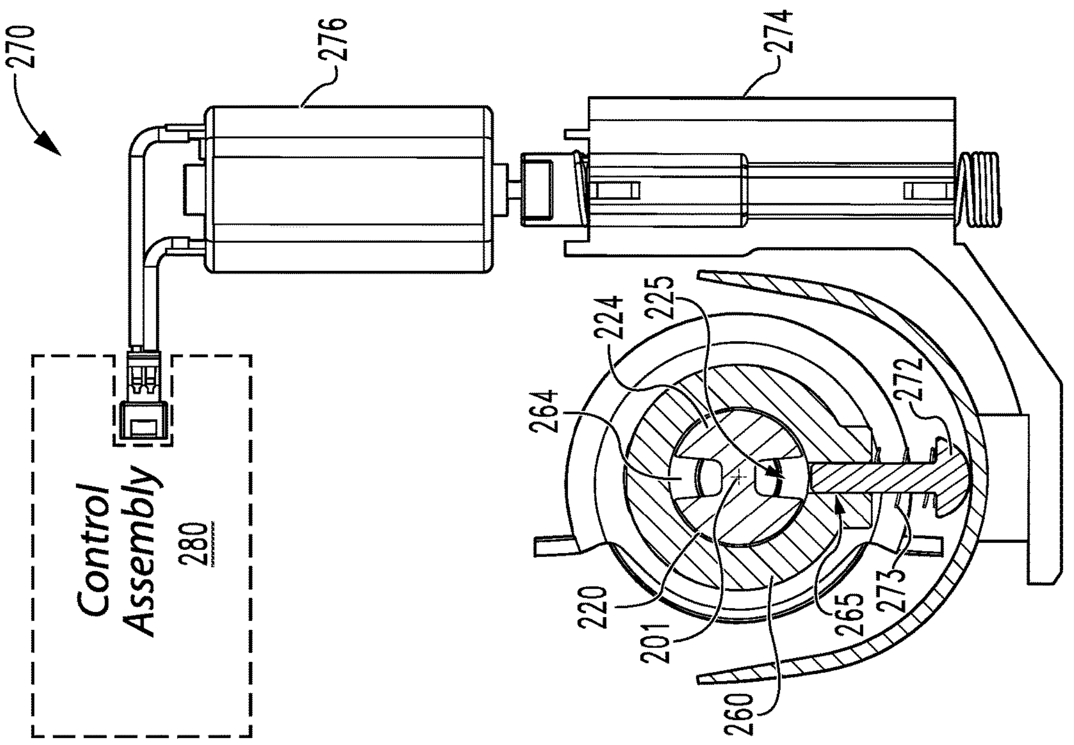
FIG. 4 is a cross-sectional view of a portion of the lockset, with an electronic lock device of the lockset in a locking state.

With additional reference to FIGS. 4 and 5, the wall 274 supports the coupler 272, and is movable between a locking position in which the wall 274 permits the bias member 273 to urge the coupler 272 toward its decoupling position (FIG. 4), and an unlocking position in which the wall 274 retains the coupler 272 in its coupling position (FIG. 5).

With the coupler 272 in its decoupling position (FIG. 4), the coupler 272 is removed from the notch 225 of the latch spindle 220 such that the latch spindle 220 is rotationally decoupled from the collar 260, and thus from the bracket 252, the outside spindle 230, and the outside handle 240. As a result, the outside handle 240 is inoperable to rotate the latch spindle 220 for actuation of the latch mechanism 120, and the outside trim assembly 200 is locked.

With the coupler 272 in its coupling position (FIG. 5), the coupler 272 extends into the notch 225 of the latch spindle 220 such that the latch spindle 220 is rotationally coupled with the collar 260, and thus with the bracket 252, the outside spindle 230, and the outside handle 240. As a result, the outside handle 240 is operable to rotate the latch spindle 220 for actuation of the latch mechanism 120, and the outside trim assembly 200 is unlocked. Such rotation of the outside handle 240 causes a corresponding rotation of the collar 260, which in turn rotates the latch spindle 220 via the coupler 272. As the coupler 272 orbits about the rotational axis 201, an arcuate portion 275 of the wall 274 supports the coupler 272 and retains the coupler 272 in its coupling position.

As noted above, the wall 274 is engaged with the actuator 276 such that the actuator 276 is operable to move the wall 274 between its locking position and its unlocking position. In the illustrated form, the actuator 276 is provided in the form of a rotary motor having an output shaft 277. The output shaft 277 is operably coupled with a spring 278, which is engaged with the wall 274 such that rotation of the spring 278 in a locking direction urges the wall 274 toward its locking position, and such that rotation of the spring 278 in an unlocking direction opposite the locking direction urges the wall 274 toward its unlocking position. In the illustrated form, the output shaft 277 is rotationally coupled with the spring 278. In other embodiments, the output shaft 277 may be engaged with the spring 278 via one or more intermediate components, such as one or more gears. Moreover, while the illustrated actuator 276 is provided in the form of a rotary motor, it is also contemplated that other forms of electrically-operable actuators may be utilized, such as a linear motor, a solenoid, and/or an electromagnet.

Figure 6:
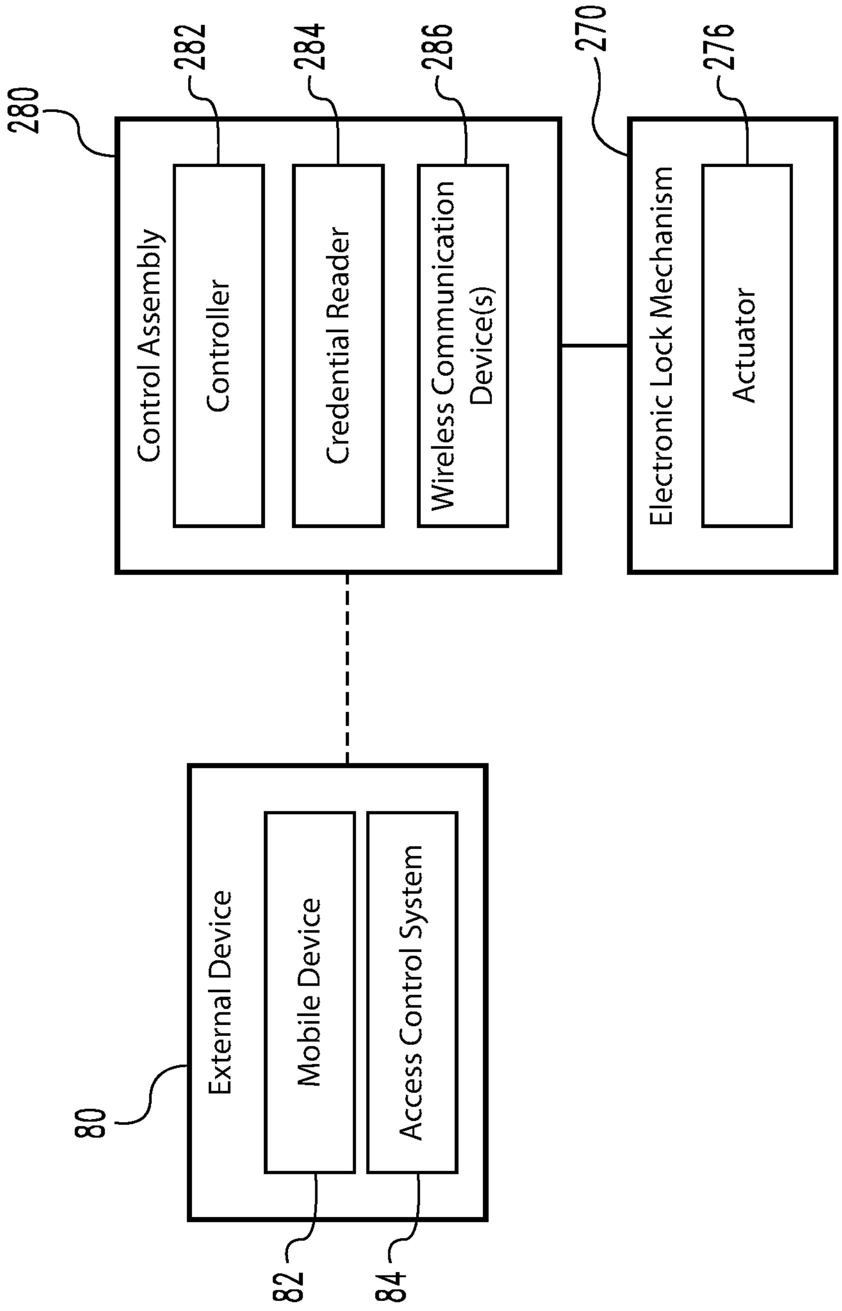
FIG. 6 is a schematic block diagram of a portion of the lockset.

With additional reference to FIG. 6, the control assembly 280 is in communication with the actuator 276, and is operable to transmit a lock/unlock signal that causes the actuator 276 to move the coupler 272 between its coupling position and its uncoupling position. When the lock/unlock signal comprises a lock signal, the actuator 276 rotates the shaft 277 in a first direction to thereby rotate the spring 278 in its locking direction, thereby moving the coupler 272 toward its decoupling position and locking the trim assembly 200. When the lock/unlock signal comprises an unlock signal, the actuator 276 rotates the shaft 277 in a second direction to thereby rotate the spring 278 in its unlocking direction, thereby moving the coupler 272 toward its coupling position and unlocking the trim assembly 200.

In the illustrated form, the control assembly 280 generally includes a controller 282 operable to transmit the lock/unlock signal, and may further include one or more of a credential reader 284 and/or a wireless communication device 286 operable to wirelessly communicate with an external device 80, such as a mobile device 82 and/or an access control system 84 (e.g., a smart home system). In certain forms, the control assembly 280 may include an onboard power source, such as one or more batteries. It is also contemplated that the control assembly 280 may be configured for connection to line power, or to receive wireless power. In certain forms, at least a portion of the control assembly 280 may be mounted in the inside trim assembly 110. As noted above, it is also contemplated that at least a portion of the control assembly 280 may be mounted elsewhere.

In certain forms, the credential reader 284 may be mounted to the escutcheon 210 and may, for example, comprise one or more of a card reader, a keypad, and/or a biometric reader. It is also contemplated that the credential reader 284 may not necessarily be mounted to the escutcheon 210, and that the credential reader 284 may be operable to read another form of credential in addition and/or as an alternative to one or more of an electronic credential, a passcode, or a biometric credential. The wireless communication device 286 may be configured to communicate wirelessly via one or more frequencies and/or one or more protocols, such as WiFi, Bluetooth (including Bluetooth Low Energy), Zigbee, and/or additional and/or alternative protocols.

The controller 282 may be in communication with the credential reader 284 and/or the wireless communication device 286, and may transmit the lock/unlock signal based at least in part upon information received via the credential reader 284 and/or the wireless communication device 286. As one example, the controller 282 may transmit the unlock signal in response to receiving an authorized credential via the credential reader 284, and may transmit a lock signal a predetermined time period after transmitting the unlock signal to thereby relock the outside trim assembly 200. In certain forms, the controller 282 may transmit the lock/ unlock signal based upon information received via the wireless communication device 286, such as from an external device 80.

In the illustrated embodiment, the actuator 276 is provided in the form of a rotary motor that rotates an output shaft 277 to thereby drive the wall 274 between its locking position and its unlocking position. It is also contemplated that another form of actuator may be utilized. As one example, a linear actuator such as a linear motor or a solenoid may be utilized to drive the coupler 272 between its coupling position and its uncoupling position. As another example, the actuator may include an electromagnet that drives the coupler 272 between its coupling position and its decoupling position.

Figure 7:
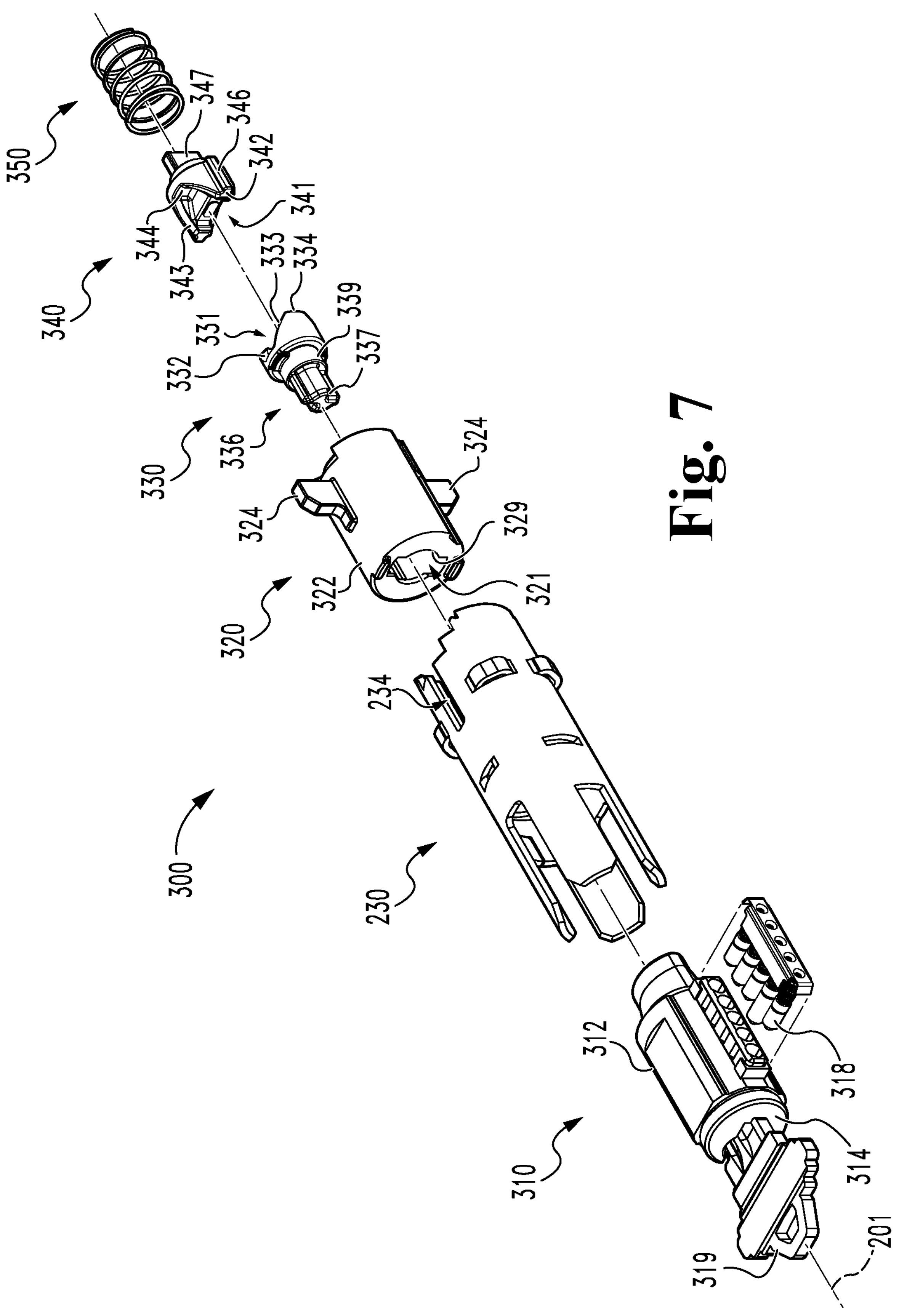
FIG. 7 is a first exploded assembly view of a spindle and an override mechanism according to certain embodiments.
Figure 8:
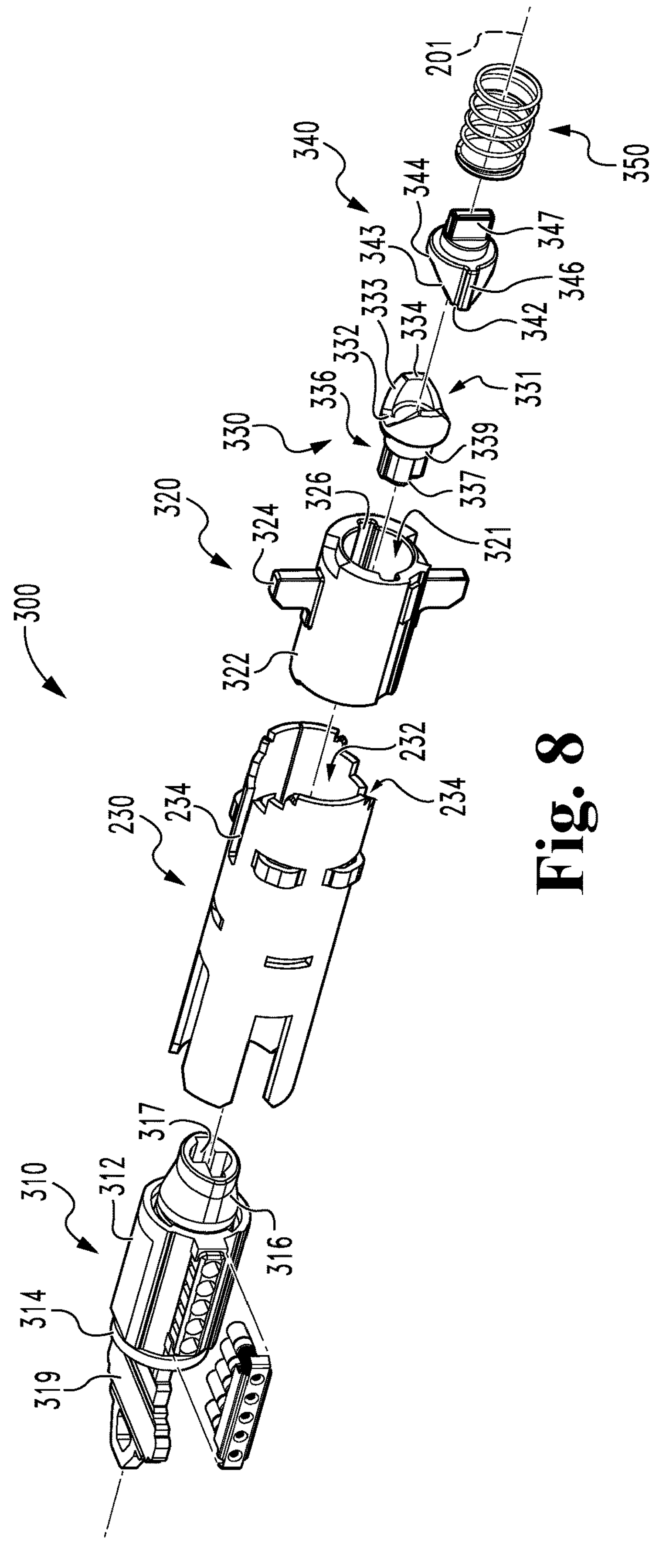
FIG. 8 is a second exploded assembly view of the spindle and the override mechanism.

With additional reference to FIGS. 7 and 8, the override mechanism 300 is mounted within the outside spindle 230, and generally includes a lock cylinder 310, a shell 320 rotationally coupled with the spindle 230, a driver 330 rotatably mounted in the shell 320, a follower 340 slidably mounted in the shell 320, and a bias member 350 urging the follower 340 into engagement with the driver 330. As described herein, the override mechanism 300 is operable to selectively couple the outside drive spindle 230 with the latch spindle 220, and may alternatively be referred to herein as a clutch mechanism 300. Moreover, because the override mechanism 300 extends along the rotational axis 201 and includes one or more components movable along the rotational axis 201, the override mechanism 300 may be referred to as an inline clutch mechanism 300.

The lock cylinder 310 is mounted in the outside spindle 230 and the handle 240, and generally includes a lock cylinder shell 312, a plug 314 rotatably mounted in the shell 312, a tailpiece 316 rotationally coupled with the plug 314, and a tumbler assembly 318 operable to selectively prevent rotation of the plug 314 relative to the shell 312. The shell 312 is rotationally coupled with the spindle 230 and the handle 240, and may house a portion of the tumbler assembly 318. The tailpiece 316 includes an engagement feature 317 that facilitates rotational coupling of the plug 314 with the driver 330 as described herein. In the illustrated form, the engagement feature 317 is provided in the form of a recess with a bowtie-shaped cross-section. It is also contemplated that other geometries may be utilized to rotationally couple the tailpiece 316 with the driver 330.

The tumbler assembly 318 has a blocking state in which the tumbler assembly 318 prevents rotation of the plug 314 relative to the shell 312, and an unblocking state in which the tumbler assembly 318 does not block rotation of the plug 314 relative to the shell 312. The tumbler assembly 318 is configured to move from the blocking state to the unblocking state in response to insertion of a proper key 319. In the illustrated form, the tumbler assembly 318 is provided in the form of a pin tumbler assembly. It is also contemplated that the tumbler assembly 318 may comprise additional and/or alternative forms of tumblers, such as disc tumblers and/or wafer tumblers.

The override mechanism shell 320 includes a generally cylindrical body portion 322 seated within the spindle 230, and a pair of flanges 324 that project radially outward from the body portion 322. The shell 320 defines a chamber 321 in which the driver 330 and the follower 340 are seated, and into which the post 226 of the latch spindle 220 extends. The flanges 324 extend through the longitudinal slots 234 of the spindle 230, and thereby rotationally couple the shell 320 with the spindle 230. The flanges 324 are also seated in the notches 254 of the bracket 252, and thereby rotationally couple the spindle 230 with the bracket 252 such that the spring cage 250 rotationally biases the spindle 230 toward its home position. Formed within the body portion 322 are a pair of grooves 326 that facilitate the rotational coupling of the follower 340 with the shell 320 as described herein. A proximal end portion of the body portion 322 includes a proximal wall 328 defining an opening 329 that rotatably supports the driver 330. The distal end portion of the shell 320 may include a pair of recesses 323 that receive the pair of lugs 263 to facilitate rotational coupling of the collar 260 with the shell 320.

The driver 330 is rotatably mounted in the shell 320, and generally includes a distal end portion facing the follower 340, a proximal end portion facing the lock cylinder 310, and a central portion connecting the distal end portion and the proximal end portion. The distal end portion of the driver 330 includes a driver cam interface 331, which generally includes a proximal landing 332, a distal landing 334, and one or more ramps 333 extending between and connecting the proximal landing 332 and the distal landing 334. While other forms are contemplated, in the illustrated form, the driver cam interface 331 includes a pair of proximal landings 332, a pair of distal landings 334, and four ramps 333, with each ramp 333 extending between and connecting a corresponding proximal landing 332 and a corresponding distal landing 334. The proximal end portion of the driver 330 includes a post 336 defining an engagement feature 337, which is engaged with the engagement feature 317 of the lock cylinder 310 such that the driver 330 is rotationally coupled with the plug 314 via the tailpiece 316. The central portion of the driver 330 includes a cylindrical body 339, which is seated in a circular portion of the opening 329 such that the shell 320 rotatably supports the driver 330.

In the illustrated form, the tailpiece engagement feature 317 is provided in the form of an bowtie-shaped recess, and the driver engagement feature 337 is provided in the form of an bowtie-shaped post. It is also contemplated that other geometries may be utilized. For example, the tailpiece engagement feature 317 may instead be provided in the form of a post having a first geometry, and the driver engagement feature 337 may be provided in the form of a recess having a second geometry configured to mate with the first geometry of the male post.

The follower 340 includes a proximal end portion that faces the driver 330 and defines a follower cam interface 341, which generally includes a proximal landing 342, a distal landing 344, and one or more ramps 343 extending between and connecting the proximal landing 342 and the distal landing 344. While other forms are contemplated, in the illustrated form, the follower cam interface 341 includes a pair of proximal landings 342, a pair of distal landings 344, and four ramps 343, with each ramp 343 extending between and connecting a corresponding proximal landing 342 and a corresponding distal landing 344. The illustrated follower 340 also includes one or more splines 346 that engage the one or more grooves 326 of the shell 320 to thereby rotationally couple the follower 340 with the shell 320 while permitting longitudinal sliding movement of the follower 340 relative to the shell 320. The distal end portion of the follower 340 also includes an engagement feature 347 operable to selectively engage the engagement feature 227 of the post 226 to thereby rotationally couple the follower 340 with the latch spindle 220. The follower 340 may also be referred to as a coupler 340 of the override mechanism 300 or as a second coupler 340.

In the illustrated form, the follower engagement feature 347 is provided in the form of a flat post, and the latch spindle engagement feature 227 is provided in the form of a slot. It is also contemplated that other geometries may be utilized. For example, the follower engagement feature 347 may instead be provided in the form of a recess having a first geometry, and the latch spindle engagement feature 227 may be provided in the form of a post having a second geometry configured to mate with the first geometry of the female recess.

The bias member 350 is positioned between the follower 340 and the bracket 252, the latter of which anchors the bias member 350 such that the bias member 350 proximally urges the follower 340 into engagement with the driver 330. In the illustrated form, the bias member 350 is provided in the form of a compression spring. It is also contemplated that the bias member 350 may take another form, such as one including an extension spring, a leaf spring, a torsion spring, an elastic member, and/or one or more magnets.

Figure 9:
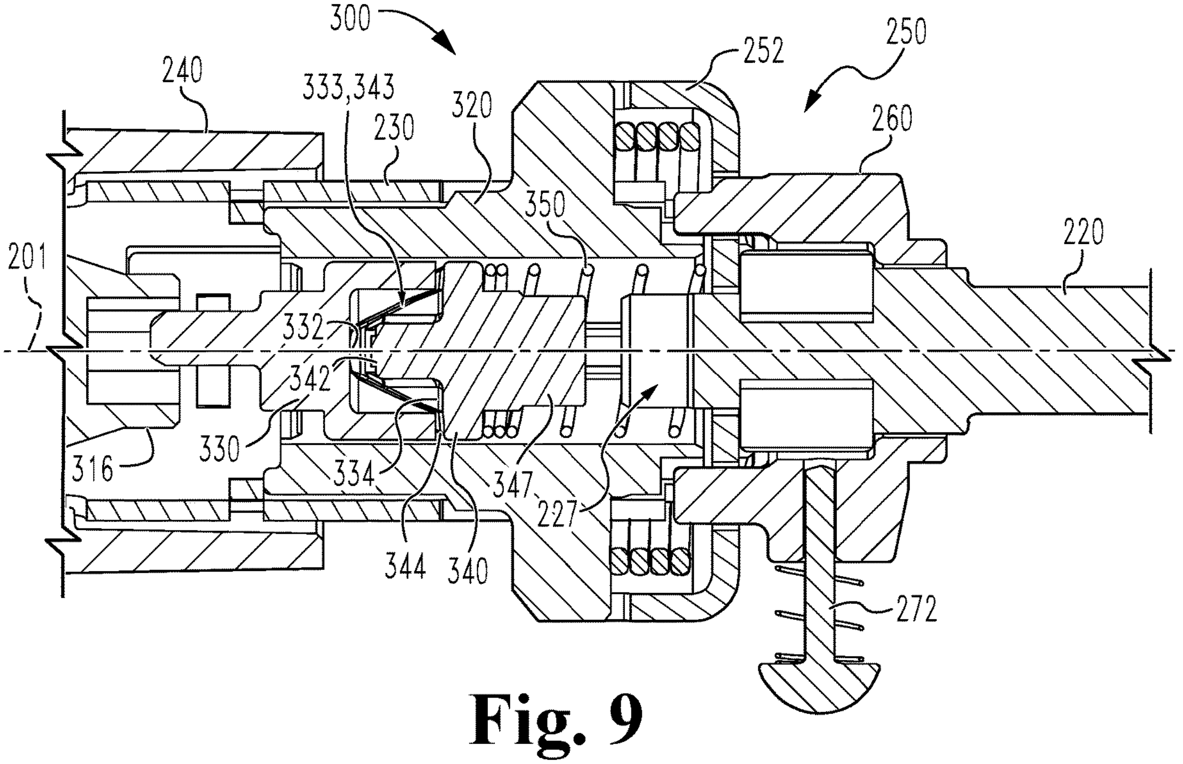
FIG. 9 is a cross-sectional view of a portion of the lockset with the override mechanism in a locking state.
Figure 10:
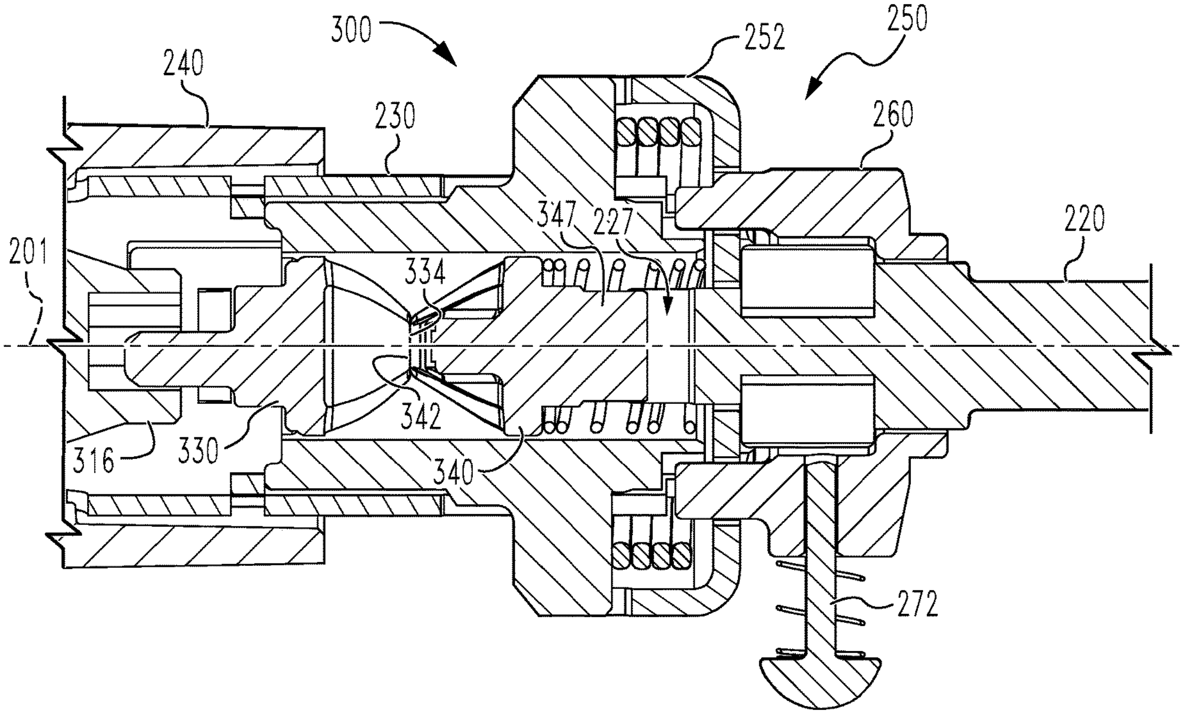
FIG. 10 is a cross-sectional view of a portion of the lockset with the override mechanism in an unlocking state.

With additional reference to FIGS. 9 and 10, the override mechanism 300 has a locking state (FIG. 9) and an unlocking state (FIG. 10), and is operable to be transitioned between the locking state and the unlocking state by the lock cylinder 310. As described herein, the override mechanism 300 is operable to mechanically unlock the outside trim assembly 200, even when the electronic lock mechanism 270 has not moved the coupler 272 to its coupling position, or is unable to do so (e.g., in the event of a power failure condition).

With the override mechanism 300 in its locking state (FIG. 9), the bias member 350 urges the follower 340 to its proximal locking position, in which the proximal landings 332, 342 are adjacent to and/or engaged with one another, the distal landings 334, 344 are adjacent to and/or engaged with one another, and the ramps 333, 343 face and/or engage one another. With the follower 340 in its locking position, the follower engagement feature 347 is disengaged from the latch spindle engagement feature 227 such that the latch spindle 220 is rotationally decoupled from the follower 340, and thus from the shell 320, the outside spindle 230, and the outside handle 240. As a result, the outside handle 240 cannot rotate the latch spindle 220 for actuation of the latch mechanism 120 unless and until the coupler 272 is moved to its coupling position and/or the follower 340 is moved to its distal unlocking position.

In order to transition the override mechanism 300 from its locking state (FIG. 9) to its unlocking state (FIG. 10), the key 319 may be inserted into the plug 314 and rotated to thereby rotate the tailpiece 316 and the driver 330. Such rotation of the driver 330 causes the driver ramp(s) 333 to engage the follower ramp(s) 343, thereby distally urging the follower 340 toward its unlocking position against the force of the bias member 350. Sliding movement of the follower 340 relative to the shell 320 is facilitated by engagement of the grooves 326 and splines 346, which also rotationally couple the shell 320 and the follower 340. Continued rotation of the key 319 to a rotated position drives the follower 340 to its unlocking position, thereby setting the override mechanism 300 to its unlocking state.

With the override mechanism 300 in its unlocking state (FIG. 10), the driver 330 maintains the follower 340 in its distal unlocking position against the urging of the bias member 350. More particularly, the distal landings 334 of the driver 330 are engaged with the proximal landings 342 of the follower 340, and thereby retain the follower 340 in its distal unlocking position. With the follower 340 in its unlocking position, the follower engagement feature 347 is engaged with the latch spindle engagement feature 227 such that the latch spindle 220 is rotationally coupled with the follower 340, and thus with the shell 320, the outside spindle 230, and the outside handle 240. As a result, the outside handle 240 is able to rotate the latch spindle 220 for actuation of the latch mechanism 120, and the outside trim assembly 200 is unlocked.

Figure 11:
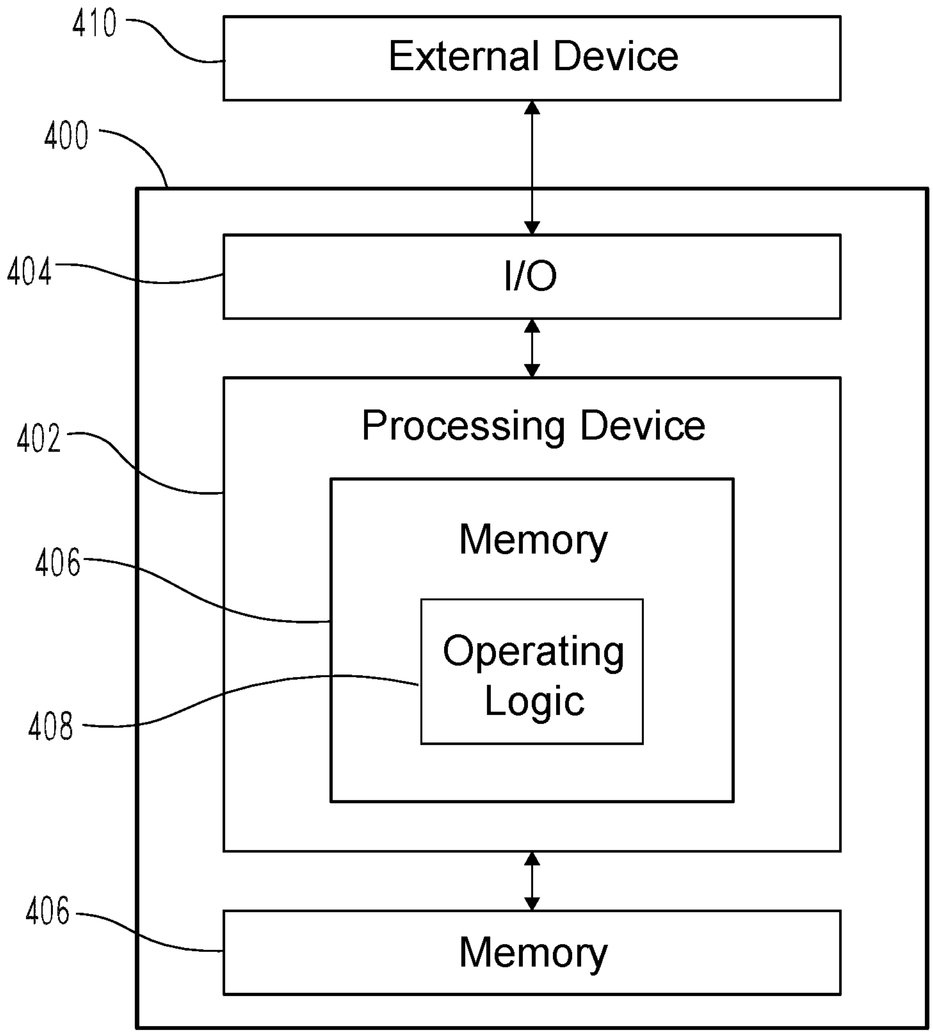
FIG. 11 is a schematic block diagram of a computing device that may be utilized in certain embodiments.

Referring now to FIG. 11, a simplified block diagram of at least one embodiment of a computing device 400 is shown. The illustrative computing device 400 depicts at least one embodiment of a controller that may be utilized in connection with the controller 282 illustrated in FIG. 6.

Depending on the particular embodiment, the computing device 400 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as the external device 80, the actuator 276, the credential reader 284, and/or the wireless communication device(s) 286. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is of a programmable variety that executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable variety, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As illustrated, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 11, it should be appreciated that a particular computing device 400 may include multiple processing devices 402, I/O devices 404, and/or memories 406 in other embodiments. Further, in some embodiments, more than one external device 410 may be in communication with the computing device 400.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock apparatus, comprising:
- a housing;
- a latch spindle mounted for rotation relative to the housing, wherein the latch spindle is operable to actuate a latch mechanism associated with the lock apparatus;
- a drive spindle mounted for rotation relative to the housing;
- an electronic lock mechanism disposed in the housing and comprising:
  - a first coupler operable to selectively couple the drive spindle with the latch spindle when the first coupler is moved in a first direction; and
  - an actuator operable to move the first coupler in the first direction; and
- an override mechanism disposed in the drive spindle and comprising a second coupler operable to selectively couple the drive spindle with the latch spindle when the second coupler is moved in a second direction transverse to the first direction.

2. The lock apparatus of claim 1, wherein the override mechanism further comprises:
- a lock cylinder; and
- a driver rotationally coupled with a plug of the lock cylinder;
  - wherein the second coupler is engaged with the driver, rotationally coupled with the drive spindle, and movable relative to the drive spindle between a locking position and an unlocking position;
- wherein rotation of the driver from a home position to a rotated position drives the second coupler from the locking position to the unlocking position;
- wherein the second coupler in the locking position is disengaged from the latch spindle; and
- wherein the second coupler in the unlocking position rotationally couples the drive spindle with the latch spindle.

3. The lock apparatus of claim 2, wherein the locking position and the unlocking position of the second coupler are offset from one another along a longitudinal rotational axis of the drive spindle; and wherein the override mechanism further comprises at least one ramp configured to longitudinally urge the second coupler from the locking position toward the unlocking position in response to rotation of the driver from the home position to the rotated position.

4. The lock apparatus of claim 2, wherein the override mechanism further comprises an override mechanism shell rotationally coupling the second coupler with the drive spindle.

5. The lock apparatus of claim 2, wherein the second coupler is biased toward the locking position.

6. The lock apparatus of claim 1, wherein the first coupler is movable between a first coupling position and a first decoupling position;

wherein the second coupler is movable between a second coupling position and a second decoupling position;

wherein the latch spindle is decoupled from the drive spindle when the first coupler is in the first decoupling position and the second coupler is in the second decoupling position;

wherein the drive spindle is operable to rotate the latch spindle when the first coupler is in the first coupling position; and wherein the drive spindle is operable to rotate the latch spindle when the second coupler is in the second coupling position.

7. The lock apparatus of claim 6, wherein the first coupling position is offset from the first decoupling position in the first direction; and wherein the second coupling position is offset from the second decoupling position in the second direction.

8. The lock apparatus of claim 7, wherein the latch spindle is rotatable about a rotational axis;

wherein the first direction extends transverse to the rotational axis; and wherein the second direction extends along the rotational axis.

9. The lock apparatus of claim 1, wherein the second direction is a longitudinal direction extending along a rotational axis of the drive spindle.

10. A lock apparatus, comprising:

a housing;

a latch spindle mounted for rotation relative to the housing, wherein the latch spindle is operable to actuate a latch mechanism;

a drive spindle mounted for rotation relative to the housing about a longitudinal axis;

a clutch mechanism disposed in the drive spindle, the clutch mechanism comprising:

a driver mounted for rotation relative to the drive spindle between a locking position and an unlocking position;

a follower rotationally coupled with the drive spindle and longitudinally movable relative to the drive spindle between a decoupling position and a coupling position; and a lock cylinder seated in the drive spindle, wherein a plug of the lock cylinder is operable to rotate the driver from the locking position to the unlocking position; and an electronic lock mechanism disposed in the housing and operable to selectively couple the drive spindle with the latch spindle by moving a coupler in a direction transverse to the longitudinal axis;

wherein rotation of the driver from the locking position to the unlocking position longitudinally drives the follower from the decoupling position to the coupling position;

wherein the follower in the coupling position rotationally couples the drive spindle with the latch spindle; and wherein the follower in the decoupling position does not rotationally couple the drive spindle with the latch spindle.

11. The lock apparatus of claim 10, wherein the clutch mechanism further comprises a shell rotationally coupling the follower with the drive spindle.

12. The lock apparatus of claim 10, wherein the decoupling position and the coupling position are offset from one another along the longitudinal axis.

13. The lock apparatus of claim 10, wherein the clutch mechanism is operable to couple the drive spindle with the latch spindle when the electronic lock mechanism is unpowered.

14. A lock apparatus, comprising:

a housing;

a drive spindle mounted for rotation relative to the housing;

a latch spindle mounted for rotation relative to the housing;

an inline clutch mechanism operable to selectively couple the drive spindle with the latch spindle, the inline clutch mechanism comprising:

a shell rotationally coupled with the drive spindle;

a driver rotatably seated in the shell, wherein the driver is rotatable relative to the shell about a longitudinal axis between a home position and a rotated position; and a follower rotationally coupled with the shell such that rotation of the follower relative to the shell is prevented, wherein the follower is longitudinally movable relative to the shell between a decoupling position in which the follower is disengaged from the latch spindle and a coupling position in which the follower engages the latch spindle to thereby rotationally couple the latch spindle with the drive spindle;

wherein the driver is engaged with the follower such that rotation of the driver from the home position to the rotated position longitudinally drives the follower from the decoupling position to the coupling position; and an electronic lock mechanism operable to selectively couple the drive spindle with the latch spindle by moving a coupler in a direction transverse to the longitudinal axis.

15. The lock apparatus of claim 14, further comprising a bias mechanism urging the follower toward the decoupling position.

16. The lock apparatus of claim 14, further comprising a lock cylinder configured for mounting in the drive spindle; and wherein the driver is engaged with a plug of the lock cylinder such that the driver rotates from the home position to the rotated position in response to actuation of the lock cylinder.

17. The lock apparatus of claim 14, wherein the coupling position and the decoupling position are offset from one another along the longitudinal axis.

18. The lock apparatus of claim 14, wherein the driver comprises a driver cam interface;

wherein the follower comprises a follower cam interface; and wherein the driver cam interface is configured to engage the follower cam interface to thereby urge the follower from the locking position to the unlocking position in response to rotation of the driver from the home position to the rotated position.

19. The lock apparatus of claim 14, wherein the latch spindle comprises a latch spindle engagement feature operable to engage a follower engagement feature of the follower;

wherein the latch spindle engagement feature is disengaged from the follower engagement feature when the follower is in the decoupling position; and wherein the latch spindle engagement feature is engaged with the follower engagement feature when the follower is in the coupling position.

* * * * *